United States Patent
Ranzinger

(10) Patent No.: US 10,789,288 B1
(45) Date of Patent: Sep. 29, 2020

(54) RELATIONAL MODEL BASED NATURAL LANGUAGE QUERYING TO IDENTIFY OBJECT RELATIONSHIPS IN SCENE

(71) Applicant: Shutterstock, Inc., New York, NY (US)

(72) Inventor: Michael Steven Ranzinger, Boulder, CO (US)

(73) Assignee: Shutterstock, Inc., New York, NY (US)

( * ) Notice: Subject to any disclaimer, the term of this patent is extended or adjusted under 35 U.S.C. 154(b) by 265 days.

(21) Appl. No.: 15/982,993

(22) Filed: May 17, 2018

(51) Int. Cl.
    *G06F 16/583*      (2019.01)
    *G06F 16/56*      (2019.01)
    (Continued)

(52) U.S. Cl.
    CPC .... *G06F 16/5854* (2019.01); *G06F 16/24578* (2019.01); *G06F 16/56* (2019.01);
    (Continued)

(58) Field of Classification Search
    CPC ................. G06F 16/5854; G06F 16/56; G06F 16/24578; G06K 9/4671; G06K 9/627;
    (Continued)

(56) References Cited

U.S. PATENT DOCUMENTS 5,465,353 A * 11/1995 Hull .................... G06K 9/00442
5,987,456 A * 11/1999 Ravela ................ G06F 16/5838
(Continued)

FOREIGN PATENT DOCUMENTS

CN      103970775 A    *   8/2014
CN    -103970775 A    *   8/2014
(Continued)

OTHER PUBLICATIONS

Ganea et al., "Image Indexing by Spatial Relationship between Salient Objects", in Proceedings of the Federated Conference on Computer Science and Information Systems, IEEE, 2011, pp. 699-704. (Year: 2011).*

(Continued)

*Primary Examiner* — Phuong Thao Cao
(74) *Attorney, Agent, or Firm* — McDermott, Will & Emery LLP

(57) ABSTRACT

Various aspects of the subject technology relate to systems, methods, and machine-readable media for relational image querying. A system may receive a search query for content from a client device, where the query specifies one or more objects and one or more spatial relationships between the one or more objects. The system may generate a query vector for the query using a computer-operated neural language model. The system may compare the query vector to an indexed vector for each of the one or more spatial relationships between the one or more objects of an image. The system may determine a listing of relational images from a collection of images based on the comparison. The system may determine a ranking for each image in the listing of relational images, and provide search results responsive to the search query to the client device, which may include a prioritized listing of the relational images based on the determined ranking.

17 Claims, 11 Drawing Sheets

(51) Int. Cl.
*G06F 16/2457* (2019.01)
*G06N 3/08* (2006.01)
*G06T 7/70* (2017.01)
*G06K 9/62* (2006.01)
*G06F 9/46* (2006.01)
*G06K 9/46* (2006.01)
*G06N 3/04* (2006.01)

(52) U.S. Cl.
CPC ............ *G06K 9/4671* (2013.01); *G06K 9/627* (2013.01); *G06K 9/6215* (2013.01); *G06N 3/04* (2013.01); *G06N 3/08* (2013.01); *G06T 7/70* (2017.01)

(58) Field of Classification Search
CPC .......... G06K 9/6215; G06N 3/08; G06N 3/04; G06T 7/70
USPC ........................................................ 707/723
See application file for complete search history.

(56) References Cited

U.S. PATENT DOCUMENTS

| | | | | |
|---|---|---|---|---|
| 6,173,275 | B1* | 1/2001 | Caid ................ | G06F 16/58 706/14 |
| 6,240,423 | B1* | 5/2001 | Hirata .............. | G06F 16/5854 |
| 6,760,714 | B1* | 7/2004 | Caid ................ | G06K 9/4623 706/14 |
| 6,859,802 | B1* | 2/2005 | Rui .................. | G06K 9/6215 |
| 7,072,872 | B2* | 7/2006 | Caid ................ | G06K 9/4623 706/14 |
| 8,051,072 | B2* | 11/2011 | Zheng .............. | G06F 16/337 707/722 |
| 8,447,752 | B2* | 5/2013 | Wang ............... | G06F 16/5866 707/711 |
| 8,463,036 | B1* | 6/2013 | Ramesh ........... | G06K 9/4642 382/170 |
| 8,990,199 | B1* | 3/2015 | Ramesh ........... | G06F 16/5854 707/736 |
| 9,747,305 | B2* | 8/2017 | Cevahir ........... | G06K 9/46 |
| 10,354,134 | B1* | 7/2019 | Becker ............. | G06K 9/00986 |
| 10,503,775 | B1* | 12/2019 | Ranzinger ........ | G06N 3/08 |
| 2003/0113017 | A1* | 6/2003 | Thomas ........... | G06K 9/342 382/181 |
| 2004/0100483 | A1* | 5/2004 | Russell ............ | G06K 9/48 715/719 |
| 2004/0249809 | A1* | 12/2004 | Ramani ............ | G06K 9/00201 |
| 2005/0169529 | A1* | 8/2005 | Owechko .......... | G06K 9/469 382/190 |
| 2005/0223031 | A1* | 10/2005 | Zisserman ........ | G06K 9/4671 |
| 2010/0241650 | A1* | 9/2010 | Chittar ............. | G06F 16/5854 707/769 |
| 2011/0299735 | A1* | 12/2011 | Anisimovich ..... | G06K 9/6878 382/103 |
| 2011/0314031 | A1* | 12/2011 | Chittar ............. | G06Q 30/00 707/749 |
| 2012/0072410 | A1* | 3/2012 | Wang ............... | G06F 16/532 707/711 |
| 2012/0143856 | A1* | 6/2012 | Klinkigt ........... | G06K 9/4671 707/723 |
| 2012/0268612 | A1* | 10/2012 | Wang ............... | G06K 9/00624 348/207.1 |
| 2012/0269432 | A1* | 10/2012 | Wang ............... | G06F 16/5854 382/171 |
| 2013/0060766 | A1* | 3/2013 | Lin .................. | G06K 9/4676 707/723 |
| 2013/0315477 | A1* | 11/2013 | Murray ............ | G06F 16/583 382/159 |
| 2014/0244631 | A1* | 8/2014 | Arthur ............. | G06F 16/43 707/723 |
| 2014/0314313 | A1* | 10/2014 | Kennedy .......... | G06T 7/10 382/165 |
| 2014/0365410 | A1* | 12/2014 | Gallant ............ | G06N 5/04 706/12 |
| 2016/0063516 | A1* | 3/2016 | Terrazas .......... | G06K 9/6267 705/7.29 |
| 2016/0140212 | A1* | 5/2016 | Hodas .............. | G06F 16/56 707/738 |
| 2016/0239956 | A1* | 8/2016 | Kang ............... | G06T 17/005 |
| 2017/0097948 | A1* | 4/2017 | Kerr ................ | G06N 3/08 |
| 2017/0124618 | A1* | 5/2017 | Roeseler ........... | G06F 16/56 |
| 2017/0154204 | A1* | 6/2017 | Ryu ................. | G06K 9/00208 |
| 2017/0270122 | A1* | 9/2017 | He .................. | G06Q 30/0277 |
| 2017/0299435 | A1* | 10/2017 | Rhoads ............ | G01J 3/447 |
| 2017/0357853 | A1* | 12/2017 | Castanon .......... | G06K 9/00758 |
| 2018/0005088 | A1* | 1/2018 | Farfade ............ | G06K 9/6297 |
| 2018/0082436 | A1* | 3/2018 | Hattori ............. | G06T 7/70 |
| 2018/0084201 | A1* | 3/2018 | Ouchi .............. | H04N 5/23212 |
| 2018/0121768 | A1* | 5/2018 | Lin .................. | G06K 9/4628 |
| 2018/0189325 | A1* | 7/2018 | Hohwald .......... | G06F 3/04817 |
| 2018/0204111 | A1* | 7/2018 | Zadeh .............. | G06K 9/00281 |
| 2018/0232451 | A1* | 8/2018 | Lev-Tov ........... | G06F 16/5854 |
| 2018/0373737 | A1* | 12/2018 | Watanabe ......... | G06F 16/532 |
| 2019/0236371 | A1* | 8/2019 | Boonmee .......... | G06K 9/00765 |
| 2019/0272451 | A1* | 9/2019 | Lin .................. | G06K 9/6271 |

FOREIGN PATENT DOCUMENTS

CN 106202189 A * 12/2016
KR -20050116963 A * 12/2005

OTHER PUBLICATIONS

Jaworska T., "A Search-Engine Concept Based on Multi-Feature Vectors and Spatial Relationship", H. Christiansen et al. (Eds.): FQAS 2011, LNAI 7022, 2011, pp. 137-148. (Year: 2011).*

Mai et al., "Spatial-Semantic Image Search by Visual Feature Synthesis", in 2017 IEEE Conference on Computer Vision and Pattern Recognition (CVPR), Jul. 21-26, 2017, IEEE, 10 pages. (Year: 2017).*

Miao et al., "Spatial Relationship Representation for Visual Object Searching", Neurocomputing, vol. 71, Issues 10-12, Jun. 2008, pp. 1813-1823. (Year: 2008).*

* cited by examiner

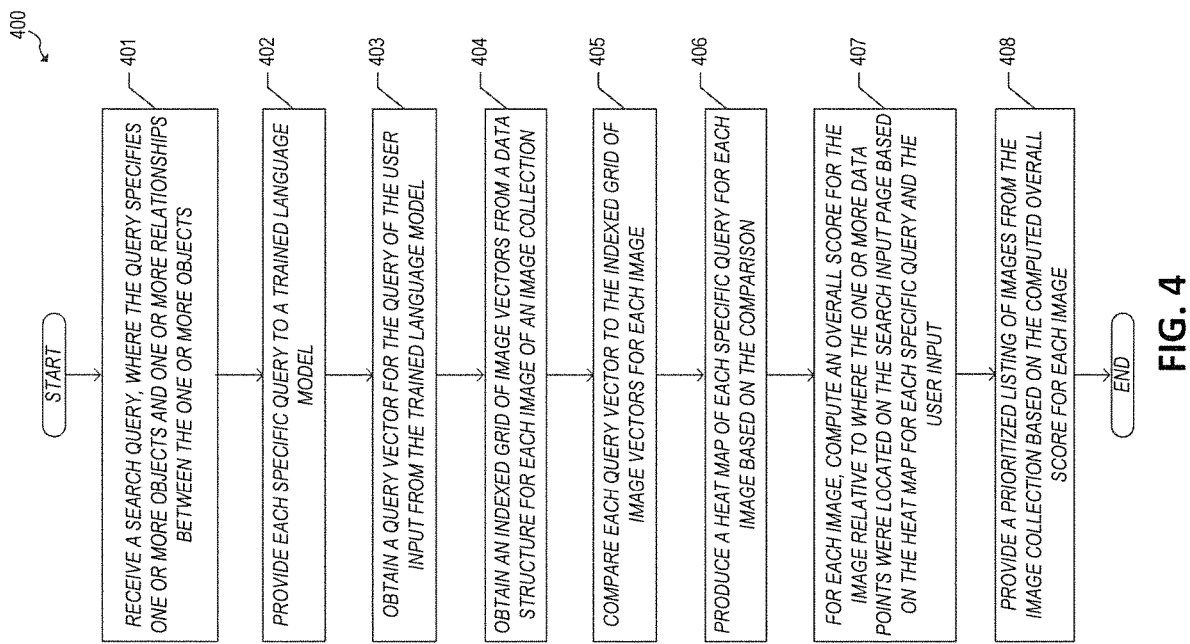

RELATIONAL MODEL BASED NATURAL LANGUAGE QUERYING TO IDENTIFY OBJECT RELATIONSHIPS IN SCENE

BACKGROUND

Field

The present disclosure generally relates to a computer-operated image retrieval system, and more particularly to relational image querying.

Description of the Related Art

An information retrieval system, such as a search engine, uses keyword searching techniques when it receives a query, such as a query for an image. The system attempts to match the terms of the query with content items from the collection that are most relevant to the query. However, while such techniques may somewhat work for generic searches, they are extremely inefficient in generating relevant result sets for queries that specify certain relationships between the terms of the query.

For example, if the query received by the system is for an image with a "red bike next to a black wall," then the existing search techniques fail to sufficiently recognize the specified relationship "next to," between the objects, "red bike" and "black wall" in the query, to rank those images that satisfy the specified relationship between the objects of the query higher than those images that do not satisfy the specified relationship between the objects. The IR system, consequently, returns a result set with those images that fail to satisfy the relationship between the objects or the IR system does not prioritize the images that satisfy the specified relationship over the images that do not satisfy the specified relationship. As a result, the user is required to supply a different query to again search through the large number of irrelevant images to identify relevant images.

SUMMARY

The present disclosure describes a system that maps an input image to a saliency map that identifies both the contents (e.g., objects) present in an image as well as their relationship in the image, which are identified by a relative strength at either the pixel level or over a discretized grid. This mapping can be used to provide relational querying using natural language for image querying that allows a user to provide a query that specifies relationships between objects in a query using natural language. This enables the user to search for images where the desired objects are not only present in the image, but also within a certain relationship with each other.

According to one embodiment of the present disclosure, a computer-implemented method is provided. The method includes receiving a search query for content from a client device, the query specifying one or more objects and one or more relationships between the one or more objects. The method includes generating a query vector using a computer-operated neural language model. The method includes comparing the query vector to an indexed vector for each of the one or more relationships between the one or more objects of an image. The method includes determining a listing of relational images from a collection of images based on the comparing. The method includes determining a ranking for each image in the listing of relational images. The method also includes providing a set of search results responsive to the search query to the client device, the set of search results including a prioritized listing of the relational images based on the determined ranking.

According to one embodiment of the present disclosure, a system is provided including one or more processors and a computer-readable storage medium coupled to the one or more processors, the computer-readable storage medium including instructions. The instructions cause the one or more processors to receive a search query for content from a client device. The instructions also cause the one or more processors to provide the search query to a trained computer-operated neural language model. The instructions also cause the one or more processors to obtain a query vector for the search query of the user input from the trained computer-operated neural language model. The instructions also cause the one or more processors to obtain an indexed grid of image vectors from a data structure for each image of an image collection. The instructions also cause the one or more processors to compare each query vector to the indexed grid of image vectors for each image. The instructions also cause the one or more processors to produce a heat map of each specific query for each image based on the comparison. The instructions also cause the one or more processors to, for each image, compute an overall score for the image relative to where the one or more data points were located on the search input page based on the heat map for each specific query and the user input. The instructions also cause the one or more processors to provide a prioritized listing of images from the image collection based on the computed overall score for each image.

According to one embodiment of the present disclosure, a non-transitory computer readable storage medium is provided including instructions that, when executed by a processor, cause the processor to perform a method. The method includes receiving a search query for content from a client device, the query specifying one or more objects and one or more relationships between the one or more objects. The method includes generating a query vector for the query using a computer-operated neural language model. The method includes comparing the query vector to an indexed vector for each of the one or more relationships between the one or more objects of an image. The method includes determining a listing of relational images from a collection of images based on the comparing. The method includes determining a ranking for each image in the listing of relational images. The method also includes providing a set of search results responsive to the search query to the client device, the set of search results including a prioritized listing of the relational images based on the determined ranking.

According to one embodiment of the present disclosure, a system is provided that includes means for receiving a search query for content from a client device, the query specifying one or more objects and one or more relationships between the one or more objects; and means for generating a query vector for the query using a computer-operated neural language model, comparing the query vector to an indexed vector for each of the one or more relationships between the one or more objects of an image, determining a listing of relational images from a collection of images based on the comparing, determining a ranking for each image in the listing of relational images, and providing a set of search results responsive to the search query to the client device, the set of search results including a prioritized listing of the relational images based on the determined ranking.

According to one embodiment of the present disclosure, a computer-implemented method is provided. The method includes receiving user input via an application on a client device to initiate an image search, the user input indicating one or more objects and one or more relationships between the one or more objects. The method includes generating, in response to the received user input, an image search query from the received user input. The method includes providing for transmission the image search query over a connection to a server, the server including an image search service that obtains one or more relational images responsive to the image search query based on a comparison between a query vector associated with the image search query and an indexed vector for each of the one or more spatial relationships between the one or more objects of an image. The method includes receiving a set of search results responsive to the image search query from the server, the set of search results including a prioritized listing of the relational images based on the comparison and a ranking of the images.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 4 illustrates an example runtime process of processing user input for relational image querying using the example server of FIG. 2.

DETAILED DESCRIPTION

Figure 1:
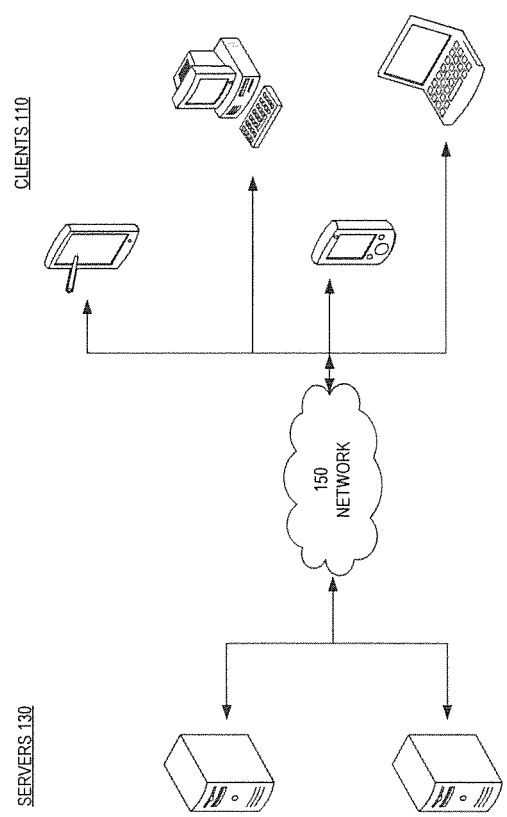
FIG. 1 illustrates an example architecture for relational image querying suitable for practicing some implementations of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

As used herein the term "relationship" may refer to a spatial relationship between two objects within an image. As used herein, the term "content item" may be used, for example, in reference to a digital file that is composed of one or more media elements of different types (text, image, video, audio, etc.). A content item can be a single picture or a single video file. The term "image identifier" as used herein may refer to a form of metadata such as a tag and/or a label associated with an image for identifying the image. As used herein, the term "saliency" may refer to the quality by which an object within an image (e.g., a foreground object) is deemed most useful for a neural network to perform the classification task. The term "saliency map" as used herein may refer to a mapping where each pixel has an associated value with its particular saliency value, where the saliency value of a pixel may refer to as the normalized attention that the pixel has in the overall scene. The term "training data" as used herein may refer to as a set of images containing positive instances of desired classes used to train an object classifier. As used herein, the term "search term" may refer to a word in a query or portion of a query comprised of a string of text, which may be a single term or multiple terms.

General Overview

A very common workflow for a user is that the user issues a textual query to the IR system where the query is intended to capture in words their mental conception. The IR system then returns a set of images, at which point the user browses through the images, many of which are likely irrelevant, hoping to find one that is relevant. Relationships between the objects in the image are important in identifying a relevant image. However, the IR systems typically fail to identify the relationships between the objects, which results in the large number of irrelevant images. Moreover, it is distracting to users to look at entire images when they care about images that display certain relationships between the objects in the image.

Relational image querying includes decomposing all images of an image collection into saliency regions for the image. A deep-learning neural network can be trained to localize a given trained class/query down to a certain number of regions of the image and identifying relationships between the objects within regions of the image. This localization is latent in what the deep-learning neural network needs to learn in order to correctly classify a test dataset, which may include a predetermined number of top queries leading to downloads over a specified date range. A drawback to this localization is that it requires the deep-learning neural network to have trained on that specific class/query and the relationships between the objects within that region. Therefore, the deep-learning neural network would be limited to the predetermined number of top queries in this manner.

In some implementations, the subject disclosure provides for the implementation of query-to-vector technology, where the deep-learning neural network learns how to map an arbitrary input query into a vector in the image embedding space. The subject system can use that query vector as a proxy for the class weights because the deep-learning neural network is trained to minimize the cosine distance between the image vector and the query vector. Given an image, instead of only storing a single vector for an image, the disclosed system can index a vector for each of the regions in the image, because each of those vectors can construct a saliency map for a defined class and a defined relationship between two or more objects in the image.

At runtime, the disclosed system enables a user to issue a query in a natural language, such as English. The disclosed system can then generate a class vector for the query using a trained neural language model, and search an index for images that contain strong evidence of the specified query. In some implementations, the system can generate a class vector for each of regions specified in a query using a trained neural language model, and search an index for images that contain strong evidence of the specified query in the specified region. Similarity between the images can be based on the cosine distance between the indexed vector for the region, and the query vector for the region. Ranking can be based on whether the specified relationship in the query matched, the number of salient regions matched, and then by their intersection-over-union coverage ratios in some implementations.

The disclosed system addresses a problem in the traditional IR systems, discovery of the most relevant images for a certain relationship between the images, which is a problem specifically arising in the realm of computer technology, by providing a solution also rooted in computer technology, namely, by considering a search engine system using an object classifier for classifying salient objects in images using a salient map of the images and identifying the relationships between these salient objects in image search results. The object classifier can classify the strength with which an image exhibits certain known objects, and relationship classifier can classify the strength with which a relationship exists between the objects. The system may use an algorithm that detects the set of objects and relationships between the set of objects from a set of example images, referred to herein as training data. The disclosed system includes training of a series of computer-operated neural networks, such as a convolutional neural network, to teach the neural network to identify features of images mapping to certain object classes and to identify relationships between the objects for identifying those images that are most relevant to an input search query that specifies a relationship between two or more objects within the image. In certain aspects, the convolutional neural network is operated on a server and accesses large amounts of image data stored in memory of the server or stored elsewhere and accessible by the server in order to train the convolutional neural network.

A set of training images may be provided to the convolutional neural network in order to teach the convolutional neural network to identify features of a training image including features related to relationships between objects in the image, and then process those features against a number of object classes and relationship classes. The disclosed system produces a set of vectors representing the object and relationship classifications for the corpus of images in the training data. The objects and relationship between identified objects are learned from running the convolutional neural network over a corpus of the training data. The trained convolutional neural network can provide a probability distribution where each data point in the distribution corresponds to likelihood that the image includes a corresponding object and a specific relationship between that corresponding object and another object in the image or the image itself. In one or more implementations, the trained convolutional neural network provides a probability that a region of an image is salient. The disclosed system determines the probability that such training image contains a salient object based on probabilistic computations per object class for that training image and that such a training image contains a relationship between that salient object and another object of the image or aspect of the image, such as foreground, background, and the like. Once the convolutional neural network has been trained to predict probabilistically which features of the training images identify certain object classes and relationships, the disclosed system generates metadata for each example image indicating the salient object, its location within the image, its relationship with the image or another object of the image. In this respect, the disclosed system can then modify the original search results by incorporating items (e.g., tags, identifiers, description) that represent the salient objects and the relationship between the salient objects for each original search result image.

The subject system provides several advantages including providing classified images that identify relationships between salient objects of the image and portions of the images. The system provides a machine learning capability where the system can learn from a content item and associated objects in order to refine search results with highly relevant content items. In this regard, the refined search results would yield content items with features that exploit the salient objects, their relationships with other objects in the image, and, in some implementations, their location within the images to facilitate the user's ability to filter through the search results. With this approach, the system can continually improve its accuracy (and keep up with trending differences of what certain salient objects look like) by incorporating user interaction data into its convolution-based salient map model. By presenting results to the user, identifying the media that a user interacts with (e.g., indicating which features among other features of an image received the most attention), and examining the results that a user ignores (e.g., indicating which features among other features of an image received the least attention), the system can continually learn and refine itself to match user preferences.

The disclosed system further provides improvements to the functioning of the computer itself because it saves data storage space, reduces system loading times and reduces the cost of system resources. Specifically, the computer hosting the collection of images to be searched is not required to maintain in data storage or repeatedly share over a network with the convolutional neural network classification information based on the trained images to be searched because the convolutional neural network, once trained, is configured to predict which features of the images in the collection of images correlate to particular object classes and which regions of the images are deemed salient. At runtime, the search query produces a search space that includes items representing salient regions of images based on a salient map of each subject image from original search results, thus reducing the cost of images provided for display (i.e., less bandwidth resources). Given that the subject system continues to learn and refine itself to match user preferences from a search query, modifying search results in real-time to emphasize the most salient region of each image in a listing of images reduces the system latency due to a lesser amount of time needed for a user to locate a desired search result image.

Although many examples provided herein describe a user's search inputs being identifiable (e.g., a user's search history identifying the user's interactions with images from a search result), or download history for images being stored, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

Example System Architecture

FIG. 1 illustrates an example architecture 100 for relational image querying suitable for practicing some implementations of the disclosure. The architecture 100 includes servers 130 and clients 110 connected over a network 150. One of the many servers 130 is configured to host a computer-operated neural network. The neural network, which can be a convolutional neural network, is trained to identify features of images corresponding to one or more image identifiers. One of the many servers 130 also hosts a collection of images. The collection of images can be searched using an image search engine (e.g., accessible through a web page on one of the clients 110). Images from the collection can also be used to train the neural network to identify features of the images and, with the addition of data indicating one or more objects, once identified, are likely to indicate whether the image contains one or more salient subjects. The servers 130 can return images tagged with metadata indicating one or more salient subjects and their locations within the images to the clients 110 in response to a search query. For purposes of load balancing, multiple servers 130 can host the neural network and multiple servers 130 can host the collection of images.

The servers 130 can be any device having an appropriate processor, memory, and communications capability for hosting the neural network, the collection of images, and the image search engine. The image search engine is accessible by various clients 110 over the network 150. The clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Example Relational Image Querying System

Figure 2:
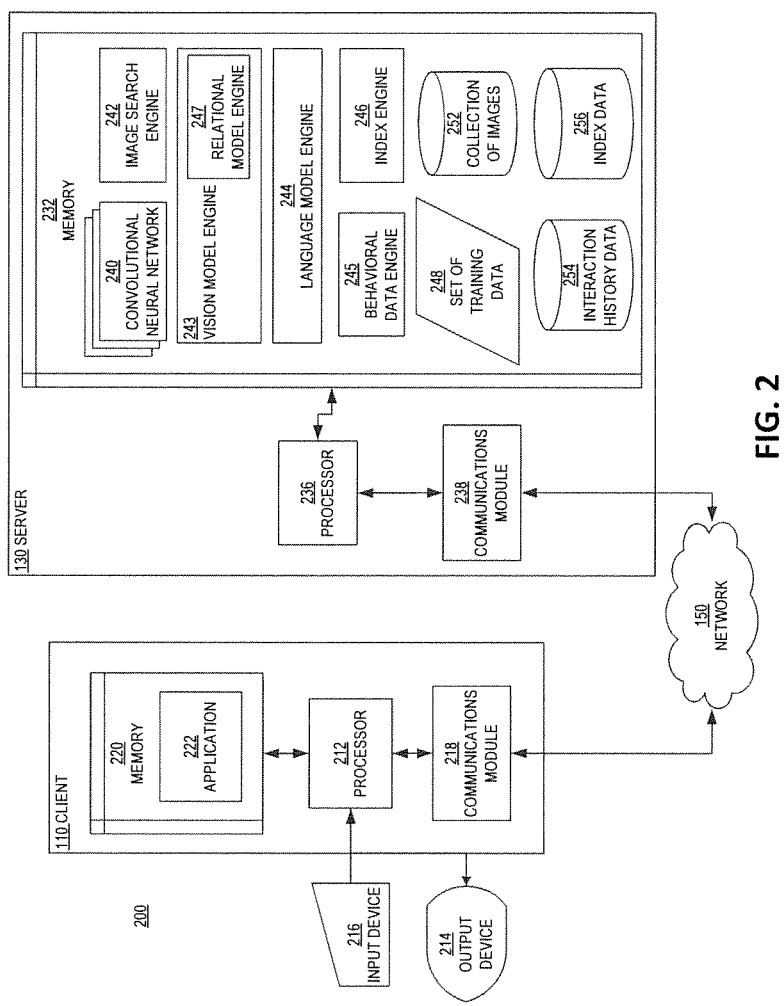
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a memory 232, a processor 236, and a communications module 238. The memory 232 of the server 130 includes a convolutional neural network 240, an image search engine 242, a language model engine 244, a vision model engine 243, a relational model engine 247, a behavioral data engine 245 and an index engine 246.

In one or more implementations, the convolutional neural network 240 may be a series of neural networks, one neural network for each object classification. As discussed herein, a convolutional neural network 240 is a type of feed-forward artificial neural network where individual neurons are tiled in such a way that the individual neurons respond to overlapping regions in a visual field. Examples of the architecture of the convolutional neural network 240 may be similar to the architectures of well-known image classification architectures such as AlexNet, GoogLeNet, or Visual Geometry Group models. In some implementations, the convolutional neural network 240 consists of a stack of convolutional layers followed by a single fully connected layer, which maps the convolutional features to a class of images. As described herein, a "class of images" is a group or category of images with which the image is associated. For example an image with a lemur may be associated with a primate category and/or a lemur category. In some implementations, the convolutional neural network 240 can include a layer to back propagate errors such that an error gradient of the convolutional neural network decreases or is below a threshold value. Examples of such loss layers include a softmax or hinge loss layer. By back propagating errors, the convolutional neural network 240 learns and adjusts its attention weights to better fit provided image data.

In some implementations, the final three layers of the convolutional neural network 240 includes a spatial operator layer, an average-over-width-height layer, and the fully connected layer as the classifier. The spatial operator layer may be configured to receive an input tensor of a configuration (e.g., batch size×number of feature maps×height× width), and produce an output tensor (e.g., batch size× number of new feature maps×new height×width). Examples of the spatial operator layer may include convolution, average pool, max pool, etc. The average-over-width-height layer may be configured to receive an input tensor of the configuration (e.g., batch size×number of feature maps× height×height), and produce an output tensor (e.g., batch size×number of feature maps) by averaging the values over the entire height and width of the tensor, per feature map. The fully connected layer may be configured to map the tensor of the configuration (e.g., batch size×number of feature maps), and produce a tensor (batch size×number of classes), where number of classes is based on the classification problem. To determine saliency, a vector after the averaged values from the average-over-width-height layer is obtained, and the cosine distance between the average vector against each vector (e.g., number of feature maps) from the previous spatial operator layer is then computed, thus producing a tensor of the configuration (e.g., batch size×height×width). In one or more implementations, the cosine distance between the output of the fully connected layer corresponding to a specified class and the output of the spatial operator layer is used to determine the saliency with respect to a specific class.

The memory 232 also includes a collection of images 252. In one or more implementations, the collection of images 252 represents a database that contains, for each image, a mapping from an image identifier to a data file containing pixel data for the image (e.g., in jpeg format). The collection of images 252 can be, for example, a dataset of trained images corresponding to an arbitrary number of object classes and relationships between the objects. Each of the images may include an indication of one or more salient objects present in the image based on the corresponding object classes applicable to the image, and an indication for one or more relationships between the salient objects in the image. The images may be paired with image vector information and image cluster information. In one or more implementations, the image vector information identifies vectors representing a large sample of images (e.g., about 50 million) and the image cluster information identifies the vectors in one or more clusters such that each of the cluster of images represents a semantic concept. In one or more implementations, the collection of images 252 includes a dataset for each image, where the dataset indicates an array of pixel values for each color channel (e.g., red, blue, green) of the image. The array of pixel values may include an integer value in a range of 0 to 255 for each pixel, where the value indicates how dark a corresponding pixel location should be. In one or more implementations, each input image may be decomposed into a set of non-overlapping regions, each of which may have uniform saliency values.

Also included in the memory 232 of the server 130 is a set of training data 248. The set of training data 248 can be, for example, a dataset of content items (e.g., images) corresponding to an arbitrary number of object classes with a predetermined number of content items (e.g., about 10,000 images) per object class and relationships. The set of training data 248 may include multiple instances (or sets) of training data, where at least one instance (or set) of training data is associated with an intended object class. For example, the set of training data 248 may include images that include features that represent positive instances of a desired class so that the convolutional neural network 248 can be trained to distinguish between images with a feature of the desired class or relationship and images without a feature of the desired class or relationship. The set of training data 248 also may include image vector information and image cluster information. In one or more implementations, the image vector information identifies training vectors representing a large sample of training images and the image cluster information identifies clusters representing respective semantic concepts. In this respect, the vectors corresponding to a semantic concept are clustered into one cluster representing that semantic concept. In one or more implementations, a predetermined number of object classes correspond to one semantic concept.

Although the set of training data 248 is illustrated as being separate from the collection of images 252, in certain aspects the set of training data 248 is a subset of the collection of images 252. Furthermore, although the collection of images 252 and the image search engine 242 are illustrated as being in the same memory 232 of a server 130 as the convolutional neural network 240, in certain aspects the collection of images 252 and the image search engine 242 can be hosted in a memory of a different server but accessible by the server 130 illustrated in FIG. 2.

The behavioral data engine 245 may be a module executed by the processor 236 that is configured to monitor (and/or track) user interactions with the search results from the image search engine 242. At runtime, the behavioral data engine 245 may facilitate incorporation of the gathered feedback by logging each occurrence of the query, image, objects, relationships, and image selected. The behavioral data engine 245 may keep track of the frequency that a certain relationships between salient objects are selected or more commonly selected.

The memory 232 also includes user interaction data 254. In certain aspects, the processor 236 is configured to determine the user interaction data 254 by obtaining user interaction data identifying interactions with images from image search results that are responsive to search queries. In this respect, the search results may be personalized based on the salient objects or regions of the most-recent images downloaded or clicked by the user. For example, the processor 236 may determine that a user interacted with an image from a search result, such as, by clicking on a segment (or region) of the image identified as salient, saving the image for subsequent access, or downloaded the image to a client (e.g., client 110), or the like. The processor 236 may keep track of the user interactions with a number of images over a given time period. In one or more implementations, the processor 236 may track the learned salient objects or regions of the last N images that the user interacted with as well as a current user query, where N is a positive integer value. The interaction history 254 may also include data indicating search behavior (and/or patterns) relating to prior image search queries.

The vision model engine 243 may be a module executed by the processor 236 that is configured to identify the most salient and prominent objects in an image and their location within the image using the convolutional neural network 240. The vision model is trained to predict which query an image is more likely to belong to given the image. Based on the architecture of the vision model, the processor 236 may obtain localization from the image. In one or more implementations, the processor 236 provides an example image to the vision model engine 243 such that the trained convolutional neural network 240 determines a saliency of each pixel in the example image with respect to an overall scene of the example image. In one or more implementations, the vision model engine 243 is configured to generate a saliency map of the example image using the trained convolutional neural network 240. For each pixel in the example image, the saliency map can provide how likely the pixel belongs to a salient object (or salient region).

The relational model engine 247 may be a sub-module of the vision model engine 243, and may be executed by the processor 236. The relational model 247 can be configured to identify one or more relationships between the objects identified in an image by the vision model engine 243. The relationships identified between the identified objects include, but is not limited to, spatial relationships between the objects. For example, if an image includes a lemur on top of a branch, and where that branch is near the top the tree, the relational model engine 247 may be configured to identify the relationship between the lemur and the branch (i.e., lemur is on top of the branch), between the branch and the tree (i.e., branch is a at the top of the tree), and between the lemur and the tree (i.e, lemur is at the top of the tree).

The relational model engine 247 includes one or more neural networks, where the architecture of the neural networks is configured to compute relational reasoning between each of the objects identified in an image by the vision model engine 243. The relational model engine 247 can be configured to accept as inputs, a set of unstructured data. Examples of such unstructured data may be embeddings generated from neural networks, such as a convolutional neural network or a long short-term memory network. For example, the processor 236 may be configured to provide the relational model engine 247 the cells of the convolutional feature maps, which may be the output of the convolutional neural network 240, trained by the vision model engine 243. For example, if each feature map is an 8×8 grid, and there are four feature maps, then the 256 cells from all four of the feature maps, are the inputs to the relational model engine 247.

The relational model engine 247 is configured to construct object pairs based on the received data. For example, the relational model engine 247 can construct objects pairs based on the feature map vectors from the image convolved by the vision model engine 243, the output of the convolutional neural network 240. Each feature map vector is based on the cells at the same coordinate across all of the feature maps generated by the convolutional neural network. For example, data in cells at coordinate 0, 0 at each feature map can form a feature vector of data in each of those cells. In some implementations, the processor 236 may provide the relational model engine 247 data that indicates which cells in a feature map is relevant for constructing the relevant objects. For example if an image has a lemur sitting on a tree with grass near the bottom of the image and sky above tree, and the received query is attempting to retrieve images where a lemur is sitting on a tree, then the relevant objects to identify for the relational model engine 247 are the lemur and the tree, but not the grass nor the sky. Thus, the relational model engine 247 can reduce processing time by ignoring the cells that do not comprise information related to the lemur or the tree.

The relational model engine 247 may include a query encoder. The query encoder may be another neural network such as a recurrent neural network. An example of the type of recurrent neural network may be a long short-term memory (LSTM) network. The query encoder of the relational model engine 247 is configured to parse a query element by element. As described herein, an element of a query is a word or a character, such as alphabets, punctuation marks (e.g., comma, question mark, and the like) in the English language. The processor 236 may provide a query received to the relational model engine 247. The relational model engine 247 may transmit the received query to the recurrent neural network of the query encoder of the relational model engine 247. Within the query encoder, each element of the query is assigned a unique value, such as an integer value, which is then used to index a learnable lookup table that provides embeddings to the neural network. Each element of the query is processed at a particular time step via the neural network. For example, at the first time step, a first element of the query is processed and at the second time step, a second element of the query is processed, and so on. The recurrent neural network of the query encoder provides context to current inputs to the recurrent neural network through the use long-short term memory. The final state of the recurrent neural network, which provides the query embedding, is associated with each object-pair constructed by the relational model engine 247.

The relational model engine 247, based on the associated query embedding, compares spatial position between each object-pair to determine relationships between each object-pair. In some implementations, the relational model engine 247 is configured to store the relationships in a vector associated with the image. In some implementations, the relational model engine 247 is configured to store the relationships in a vector associated with the feature maps, such that the next time the image is accessed, the relationship information of the image is readily accessible.

The language model engine 244 may be a module executed by the processor 236 that is configured to predict an image and/or features of the image given an arbitrary input query. When training the neural language model to predict a relationship, the processor 236, using the language model engine 244, trains the neural language model first on predicting a class, by training the neural language model that a class is a set of weights against those features that the deep learning model produced as part of the vision model, which is what the neural language model would learn. Then the neural language model is trained to predict the relationship between one or more objects within the image using a set of weights that correspond to different relationships between an object and another aspect of the image, such as another object in the image, background of the image, foreground of the image, and the like, based on deep learning model produced as part of the relational model engine 247.

In identifying a class for an image and relationships between the object of the class and another object or aspect of the image, the neural language model is trained to learn to match the direction of the feature vector produced by the vision model (e.g., after the average-over-width-height layer of the convolution neural network 240) for an image that is highly correlated to a given class and a given relationship between objects associated with that class. The feature vector produced by the vision model includes data related to features of objects and data related to relationship of the class object with another object of the image or aspect of the image. For example, for a given class "tree", the trained neural language model may return an arbitrary number of primary features that identify the object "tree", which corresponds to the features recognized by the vision model, and the relationships determined by the relational model engine 247. For example, each of the primary features includes data values that correspond to various aspects of the object "tree" and the relationship of the object "tree" with another aspect of the image, such as another object or background or foreground of the image. A given object (or concept) and a relationship may be represented over a number of dimensions, and the convolutional neural network 240 may be allowed to use up to D features to identify the given object, where D is a positive integer, and the object's relationship.

The index engine 246 may be a module executed by the processor 236 that is configured to index an image collection (e.g., the collection of images 252). Indexing may involve a drastic dimensionality reduction, from a native dimensionality of about 2.5k dimensions down to 256 dimensions to keep it attractive from a storage and search standpoint. In one or more implementations, the deep learning model implements a layer that takes an image of arbitrary aspect ratio and converts the image down to a fixed size grid, by averaging neighbor areas (e.g., 5×20 aspect ratio→5×4 size grid), hence resulting in an index of downsized images. In this respect, the image vectors of the grid for each image in the image collection are indexed.

The index data 256 may be a data structure including an array of entries, where each entry includes information relating to an image and the corresponding downsized image. For example, the index data 256 may include a vector representation of the downsized image as well as associated metadata indicating one or more image identifiers and/or keywords for the image. In one or more implementations, an index compression technique is applied to the index of images. If a single vector per image is stored, where each image includes a grid of decomposed cells (e.g., 8×8 grid), then the size of the index based on a vector per image being stored translates into a very large index. Instead of storing a vector for each cell in the grid, the processor 236, using the index engine 246, may store a predetermined number of vectors that describe a subspace within the image (e.g., a vector for each primary direction of the image) based on all spatial vectors for that image using either principle components analysis (PCA) or a k-means clustering technique. The index engine 246 stores three vectors in some implementations, and stores four vectors in other implementations, but the number of vectors retained may vary depending on implementation.

The processor 236 of the server 130 is configured to execute instructions, such as instructions physically coded into the processor 236, instructions received from software in memory 232, or a combination of both. For example, the processor 236 of the server 130 executes instructions to submit a plurality of training images containing content identifying different semantic concepts to the convolutional neural network 240 that is configured to analyze image pixel data for each of the plurality of training images to identify features, in each of the plurality of training images, corresponding to a particular semantic concept and receive, from the convolutional neural network 240 and for each of the plurality of training images, an identification of one or more object classes corresponding to the image processed by the convolutional neural network 240.

At runtime, given an arbitrary text query, the trained language model can construct a vector that matches the image that also is associated with that query. For example, the neural language model learns to construct a vector that points in approximately the same direction as the feature vectors produced by the convolutional neural network 240 in the vision model for images highly related to the given text query. The processor 236, using the image search engine 242, then takes a dot product of the vector that the neural language model generated, for every cell within the grid, across every image in the image collection (e.g., the index data 256).

The processor 236, using the image search engine 242, performs a ranking based on how well the two vectors match. In one or more implementations, the vector from the neural language model is compared to an indexed vector from the deep learning model. The comparison may determine that both vectors indicate a representation of a "lemur," as well as where are the representations of the "lemur" relative to another aspect of the image. For example, if the processor 236, using the image search engine 242, is analyzing the top left cell of a saliency map, and the image search engine 242 is looking for a representation of a "lemur" in that cell against the query vector, where the query vector based on the user input indicates that the representation of the "lemur" should be in a bottom-right cell, then the image search engine 242 issues a lower score than if the image search engine 242 was in the bottom-right cell looking for the representation of the "lemur". Given the scores determined using the image search engine 242, the image search engine 242 could sort or rank the set of the images to produce a search result. The processor 236 may then provide the search result to the application 222 on the client 110 over the network 150 for display by an output device 214 of the client 110.

Figure 3A:
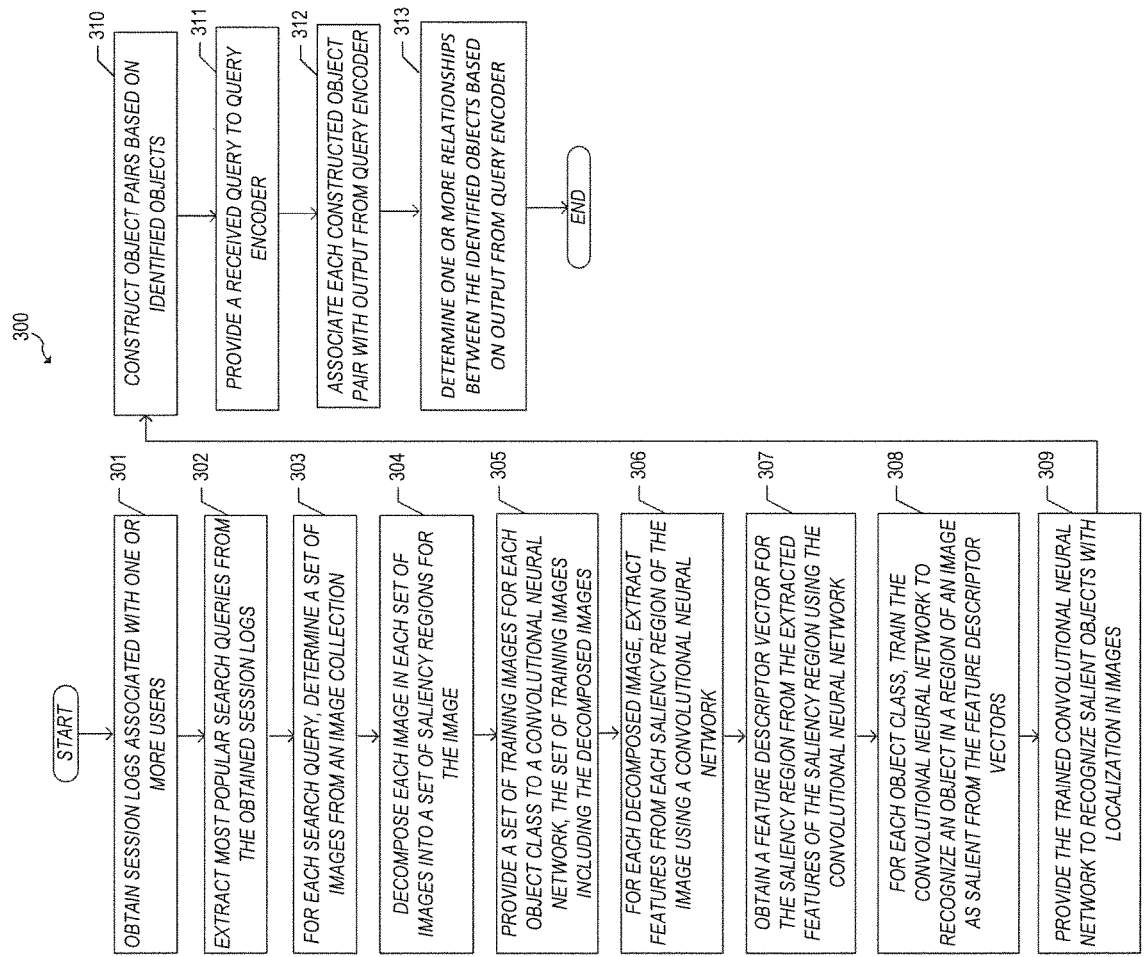
FIG. 3A illustrates an example offline process of training a convolutional neural network for identification of relationships between objects in an image using the example server of FIG. 2.

FIG. 3A illustrates an example offline process 300 of training a convolutional neural network for identification of relationships in an image using the example server of FIG. 2. While FIG. 3A is described with reference to FIG. 2, it should be noted that the process steps of FIG. 3A may be performed by other systems. The process 300 begins by proceeding from start step to step 301 where the processor 236, using the behavioral data engine 245, obtains session logs associated with one or more users.

Subsequently, in step 302, the processor 236, using the behavioral data engine 245, extracts the most popular search queries from the obtained session logs. Next, in step 303, for each extracted search query, the processor 236, using the image search engine 242, determines a set of images from an image collection (e.g., 252). Subsequently, in step 304, each image in each set of images is decomposed into a set of saliency regions for the image.

Next, in step 305, a set of training data 248 (e.g., training images) for each object class is fed through a convolutional neural network 240. For example, the convolutional neural network 240 can consist of a stack of six layers with weights, the first five layers being convolutional layers and the remaining layer being a fully-connected layer that serves as the classifier. The set of training data 248 can be fixed-size 242×242 pixel Black-White image data or Red-Green-Blue (RGB) image data. In one or more implementations, the set of training data 248 includes a data file containing pixel data for each training image. The set of training data 248 may include a different set of training images for each object class and relationships between objects. For example, the set of training data 248 may include positive instances of a desired object class and one or more relationships. The number of sets (or instances) of the training data included in the set of training data 248 may be an arbitrary number and may vary depending on implementation.

The convolutional neural network 240 may transform pixel data of each training image in the set of training images into a feature descriptor vector. For example, the convolutional neural network 240 extracts feature descriptors from the training images. The convolutional neural network 240 processes the set of training data 248 in order to learn to identify a correlation between an image and an object classification by analyzing pixel data of the image. Training with the set of training data 248 may be regularized by weight decay, and the learning rate may initially be set to $10^{-2}$ and then decreased by a factor of 10 when validation set accuracy stops improving for the convolutional neural network 240. The feature extraction algorithm executed by the convolutional neural network 240 may be implemented with a single fully connected layer of the convolutional neural network 240 in some embodiments, or with three fully connected layers of the convolutional neural network 240 in other embodiments.

Subsequently, in step 306, for each decomposed image, features are extracted from each saliency region of the image using a convolutional neural network (e.g., 240). In step 307, the convolutional neural network produces a feature descriptor vector for the saliency region from the extracted features of the saliency region.

Next in step 308, for each object class, the convolutional neural network 240 is trained to recognize an object in a region of an image as salient from the feature descriptor vectors. The convolutional neural network 240 may be trained to identify the most salient objects and their location within the image. The convolutional neural network 240 may be trained to first classify the image to a class. To compute the saliency of a region in the classified image, the convolutional neural network 240 may be trained to evaluate the contrast between the considered region (i.e., a region with a foreground object) and its surrounding area as well as the rest of the image (e.g., any background objects). Next in step 309, the trained convolutional neural network 240 is provided to recognize salient objects (or regions) with localization in images at runtime. Next in step 310, the processor 236, using the relational model engine 247, constructs object pairs based on the identified objects in images by pairing an identified object with another identified object in the image. In some implementations, the processor 236 pairs a first identified object with a second identified object by associating the each cell of a feature vector of the first identified object with a corresponding cell of a feature vector of the second identified object. For example, if a "lemur" object and a "tree" object are identified in an image, then the processor 236 can pair the "lemur" object with the "tree" object by associating a first cell that includes a feature of the "lemur" object in a feature vector comprising all features of the "lemur" object with a first cell that includes a feature of the "tree" object in a feature vector comprising all features of the "tree" object.

Next in step 311, the processor 236, using the relational model engine 247, provides a received query to a query encoder of the relational model engine 247. As described above, the received query may be parsed into multiple elements, and the processor 236 provides each element to the query encoder. Next in step 312, the processor 236, using the relational model engine 247, associates each constructed object pair with the output from the query encoder. As described above, the output of the query encoder is a final state of the recurrent neural network, which provides the question embedding. The relational model engine 247 associates this question embedding with the object pairs. Next in step 313, the relational model engine 247 determines one or more relationships between the identified objects based on the output of the query encoder.

Figure 3B:
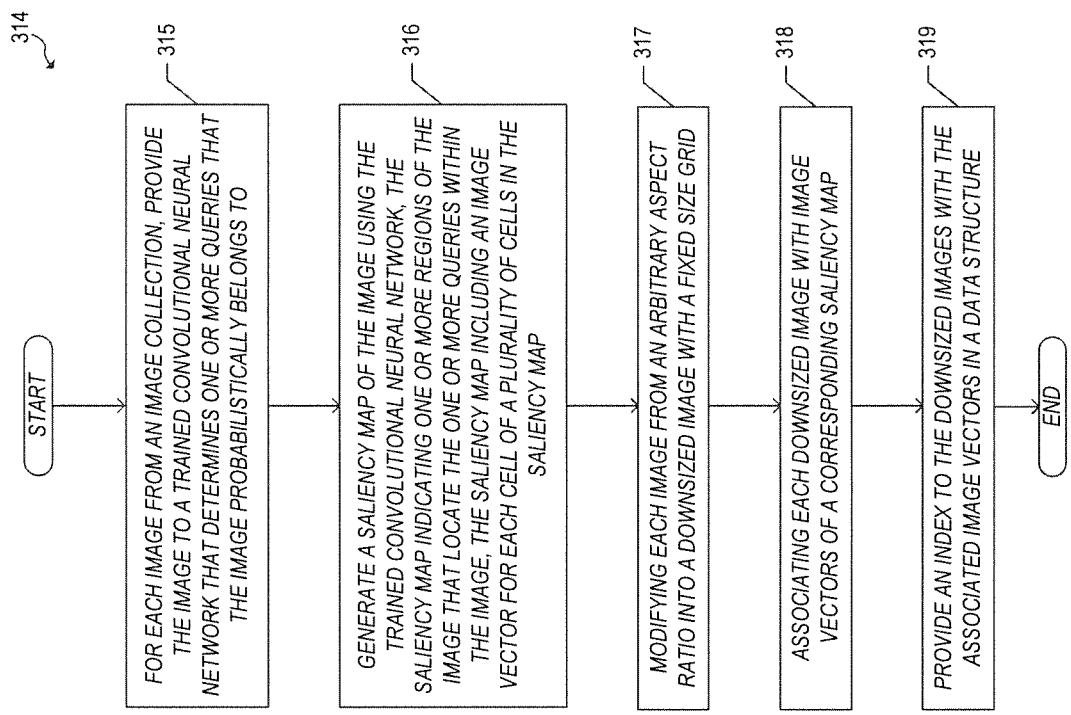
FIG. 3B illustrates an example offline process of constructing an index of images using the example server of FIG. 2.

FIG. 3B illustrates an example offline process 314 of constructing an index of images using the example server of FIG. 2. While FIG. 3B is described with reference to FIG. 2, it should be noted that the process steps of FIG. 3B may be performed by other systems. The process 314 begins by proceeding from start step to step 315 where for each image from the collection of images 252, the processor 236 feeds the image to a trained convolutional neural network (e.g., vision model engine 244) to determine one or more queries that the image probabilistically belongs to.

Next, in step 316, the processor 236, using the vision model engine 243, generates a saliency map of the image using the trained convolutional neural network 240. In one or more implementations, the saliency map includes an image vector for each cell of a plurality of cells in the saliency map.

Subsequently, in step 317, the processor 236, using the index engine 246, modifies each image from an arbitrary aspect ratio into a downsized image with a fixed size grid. Next, in step 318, the processor 236, using the index engine 246, associates each downsized image with image vectors of a corresponding saliency map. In step 319, the processor 236, using the index engine 246, provides an index to the downsized images with the associated image vectors in a data structure (e.g., the index data repository 256).

Figure 3C:
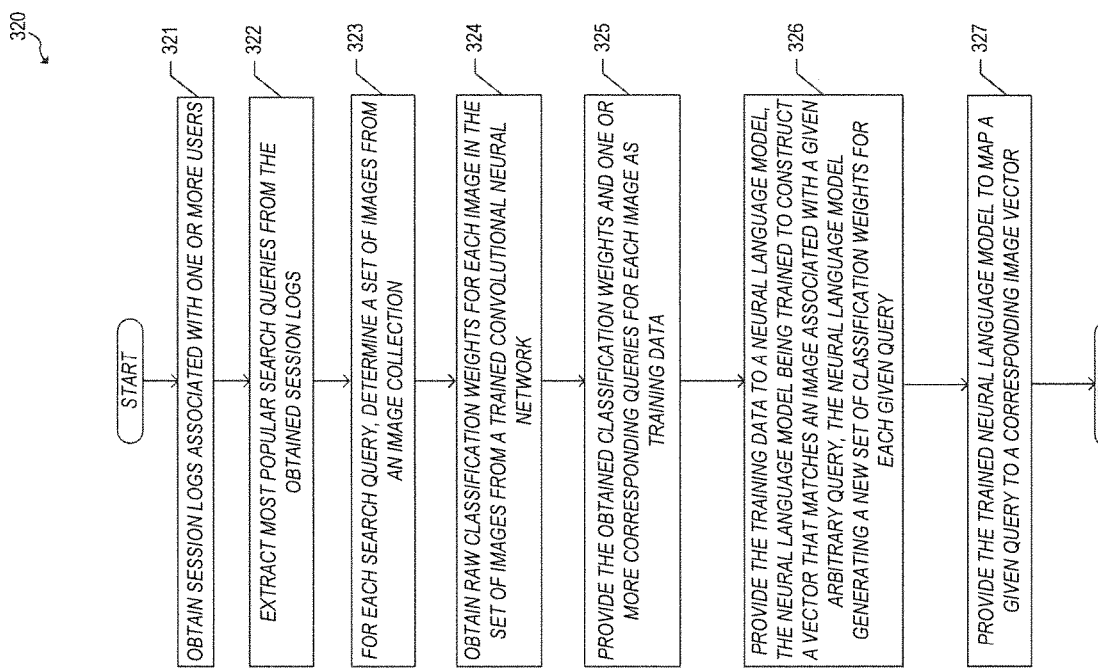
FIG. 3C illustrates an example offline process of training a convolutional neural network for identification of an image given a query using the example server of FIG. 2.

FIG. 3C illustrates an example offline process 320 of training a convolutional neural network for identification of an image given a query using the example server of FIG. 2. While FIG. 3C is described with reference to FIG. 2, it should be noted that the process steps of FIG. 3C may be performed by other systems. The process 320 begins by proceeding from start step to step 321 where the processor 236, using the behavioral data engine 245, obtains session logs associated with one or more users.

Next, in step 322, the processor 236, using the behavioral data engine 245, extracts the most popular search queries from the obtained session logs. Subsequently, in step 323, the processor 236, using the image search engine 242, determines a set of images from an image collection for each extracted search query. Next, in step 324, the processor 236, the processor 236, using the language model engine 244, obtains raw classification weights for each image in the set of images from a trained vision model (e.g., the convolutional neural network 240 executed with the vision model engine 243).

Subsequently, in step 325, the processor 236, using the language model 244, provides the obtained classification weights and one or more corresponding queries for each image as training data. Next, in step 326, the processor 236, using the language model 244, provides the training data to a neural language model (e.g., the convolutional neural network 240 executed with the language model engine 244). In one or more implementations, the neural language model is trained to construct a vector that matches an image associated with a given arbitrary query. In one or more implementations, the neural language model generates a new set of classification weights for each given query. In step 327, the processor 236, using the language model engine 246, provides the trained neural language model to map a given query to a corresponding image vector.

FIG. 4 illustrates an example runtime process 400 of processing user input for relational image querying using the example server of FIG. 2. While FIG. 4 is described with reference to FIG. 2, it should be noted that the process steps of FIG. 4 may be performed by other systems. The process 400 begins by proceeding from start step to step 401 where the image search engine 242 receives a search query for content, where the query specifies one or more objects and one or more relationships between the one or more objects Next, in step 402, the processor 236 provides the query to a trained language model (e.g., the convolutional neural network 240). Subsequently, in step 403, the processor 236, using the language model engine 244, obtains a query vector for the query from the trained language model. Next, in step 404, the processor 236, using the index engine 246, obtains an indexed grid of image vectors from a data structure (e.g., the index data 256) for each image of an image collection.

Subsequently, in step 405, the processor 236, using the image search engine 242, compares each query vector to the indexed grid of image vectors for each image. Next, in step 406, the processor 236, using the image search engine 242, produces a heat map of each specific query for each image based on the comparison. Subsequently, in step 407, for each image, the processor 236, using the image search engine 242, computes an overall score for the image relative to the one or more relationships specified in the query based on the heat map. In step 408, the processor 236, using the image search engine 242, provides a prioritized listing of images from the image collection based on the computed overall score for each image.

Figure 5:
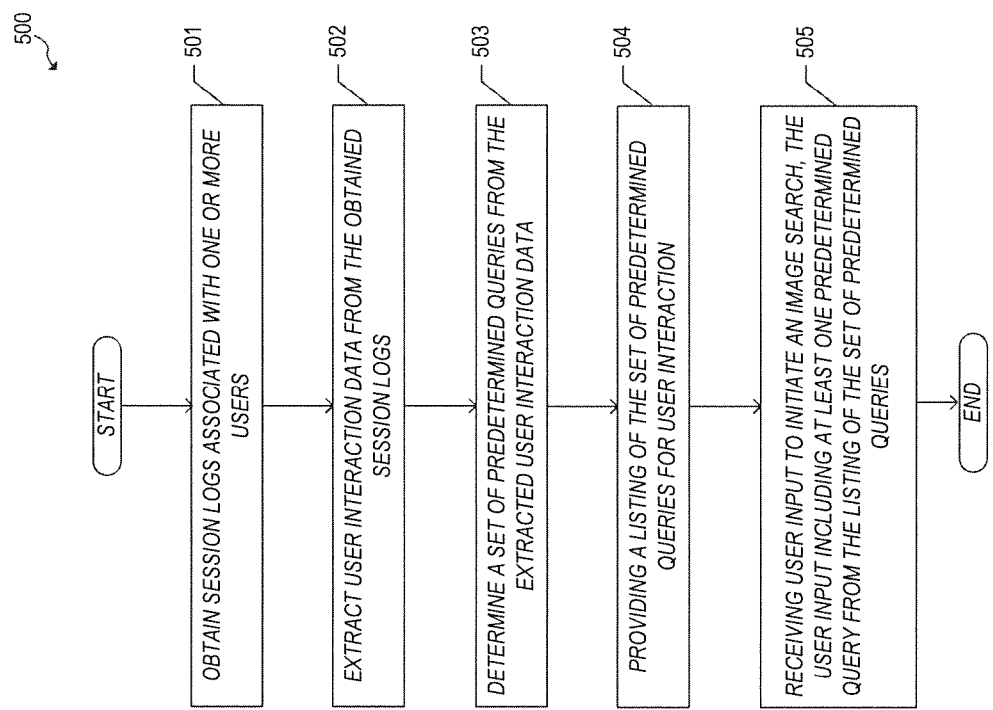
FIG. 5 illustrates an example process of identifying predetermined queries for relational image querying using the example server of FIG. 2.

FIG. 5 illustrates an example process 500 of identifying predetermined queries for relational image querying using the example server of FIG. 2. While FIG. 5 is described with reference to FIG. 2, it should be noted that the process steps of FIG. 5 may be performed by other systems. The process 500 begins by proceeding from start step to step 501 where the processor 236, using the behavioral data engine 245, obtains session logs associated with one or more users.

Next, in step 502, the processor 236, using the behavioral data engine 245, extracts user interaction data (e.g., the user interaction data 254) from the obtained session logs. Subsequently, in step 503, the processor 236, using the behavior data engine 245, determines a set of predetermined queries from the extracted user interaction data. Next, in step 504, the processor 236, using the image search engine 242 and the behavioral data engine 245, provides a listing of the set of predetermined queries for user interaction.

In step 505, the image search engine 242, receives user input to initiate an image search. In one or more implementations, the user input includes at least one predetermined query from the listing of the set of predetermined queries.

Figure 6:
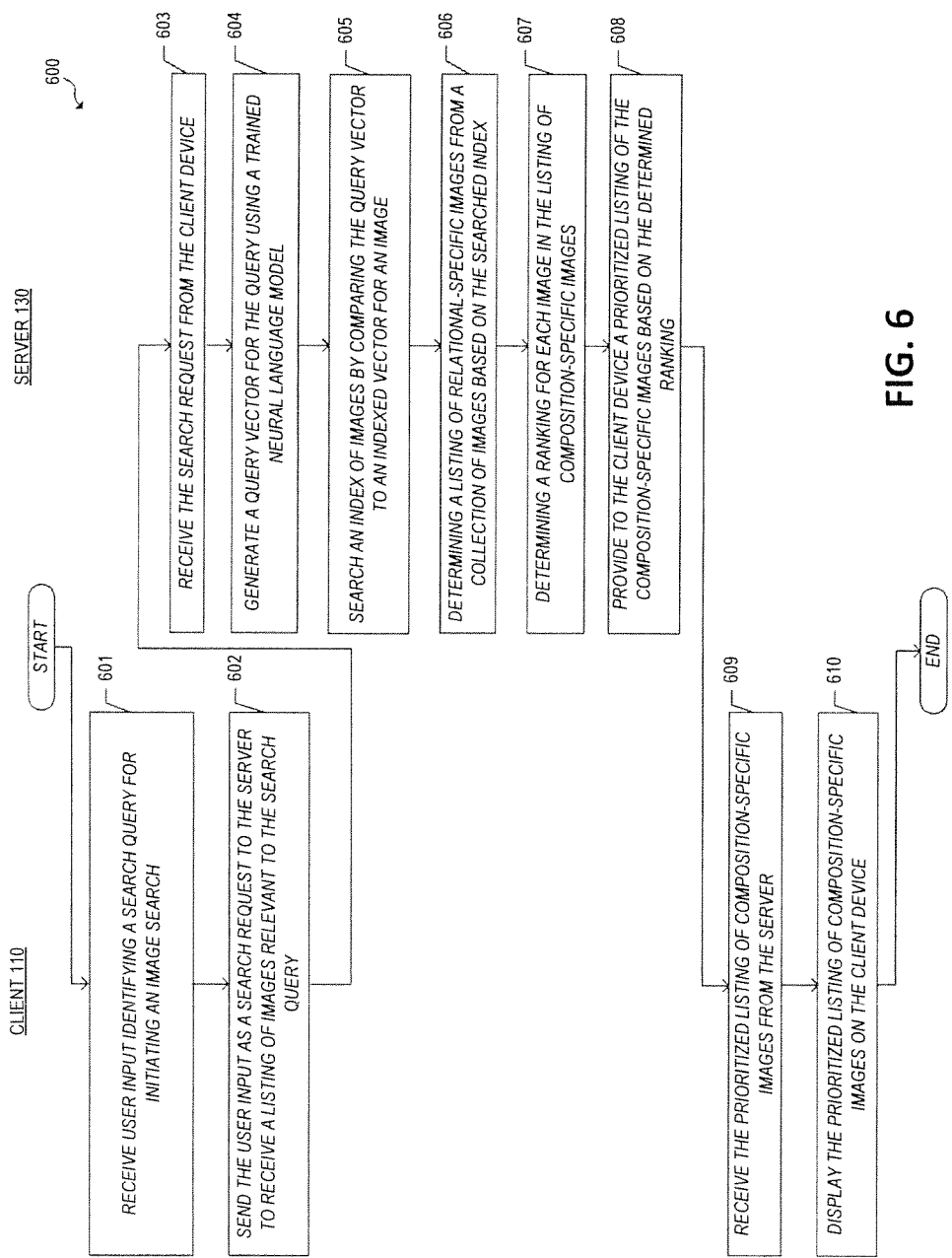
FIG. 6 illustrates an example process for content search by relational image querying using the example client and server of FIG. 2.

FIG. 6 illustrates an example process 600 for content search by relational image querying using the example client and server of FIG. 2. The process 600 begins in step 601 when a user, for example, loads an application 222 on a client 110 and the client 110 receives an input from the user using the input device 216 for a search query to initiate an image search through the collection of images 252.

The input identifies one or more search queries in a given natural language for initiating the image search. In some implementations, the input includes relationships between two or more objects specified within the input. In some implementations, the input may be provided within a search input page of the application 222. The user input may include one or more search terms, phrases, sentences and/or suitable characters that trigger the image search engine 242 to search through the collection of images 252. In this respect, a search engine may identify images that are responsive to a search query by identifying images based on one or more object classes to which the identified image may be a member and based on one or more relationships between the object classes. The user can utilize the input device 216 to submit one or more search terms and localization of such terms as part of a text-based search query via a user interface of the application 222.

Next, in step 602, the application 222 on the client 110 sends the user input as a search request to the server 130 in order to receive a listing of images responsive to the text-based search query. Turning to the server 130, in step 603, the server 130 receives the search request for a listing of images from the client 110. Subsequently, in step 604, the server 130 generates a query vector for the query using a trained neural language model (e.g., the language model engine 244 and the convolutional neural network 240).

Next, in step 605, the server 130 searches an index of images by comparing the query vector to an indexed vector for an image. Subsequently, in step 606, the server 130 determines a listing of relational-specific images from a collection of images (e.g., the collection of images 252) based on the searched index. Next, in step 607, the server 130 determines a ranking for each image in the listing of relational-specific images.

In step 608, the server 130 provides to the client 110 a prioritized listing of the relational-specific images based on the determined ranking. Turning back to the client 110, in step 609, the client 110 receives the prioritized listing of relational-specific images from the server 130. Next, in step 610, the listing of relational-specific images is provided for display via the application 222 of the client 110.

Figure 7A:
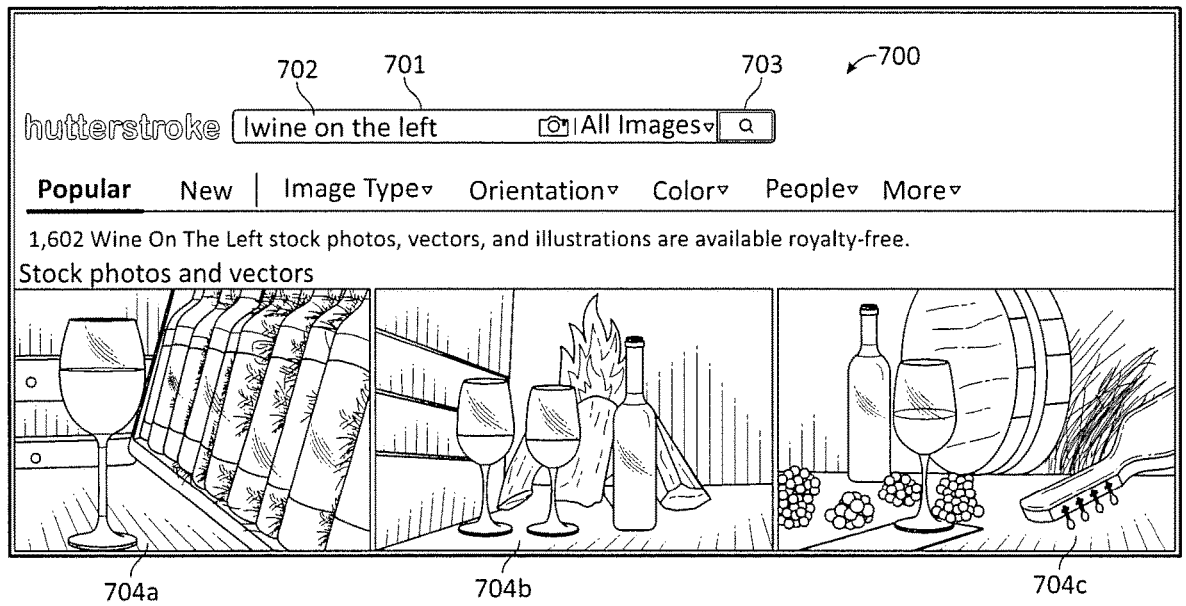
FIGS. 7A-7B illustrate example user interfaces presented to a user to receive user input and to present query results.

FIG. 6 set forth an example process 600 for content search by relational image querying using the example client and server of FIG. 2. An example will now be described using the example process 600 of FIG. 6 to describe how a user may be presented with a set of relational-specific images. An example of the client 110 is a desktop computer, a laptop computer, a smartphone, and other similar computing devices. An example of the search input page of the application 222 is a search page of a website that provides a user interface, such as a GUI, for users to input image search queries. FIG. 7A is an example screenshot of a GUI of a website that presents a search input page 700. The search input page 700 may be displayed on a smartphone of a user. The search input page 700 may include various graphical items that are configured to accept user inputs, such as a text entry box 701, which is configured to accept an search query from the user. As described above, the process 600 begins at step 601, where a user enters a search query, such as the query 702, to initiate an image search. The search query 702 is a search query that specifies that the user is interested in images that display "wine on the left." At step 602, the search query 702 may be sent from the smartphone of the user to a server, such as server 130, in response to the user providing a command to transfer the search query, such as by clicking on the button 703.

At step 603 the server receives the search query 702 from the device used by the user to enter the search query, such as the smartphone of the user. At step 604, the server generates a query vector for the query using a trained neural language model, and at step 605, the server searches an index of images by comparing the query vector to an indexed vector for an image. At step 606, the server determines a listing of relational-specific images from a collection of images based on the searched index. The images in the listing of relational-specific images for the search query 702 include images that display wine on the left portion or side of the image. At step 607, the server determines a ranking for each image in the listing of relational-specific images. The ranked list of images may include images 704a, 704b, 704c, as shown in FIG. 7A, for the search query 702.

At step 608, the server provides a prioritized list of relational-specific images based on the ranking of the images to the device used by the user to enter the search query 702, such as the smartphone of the user. At step 609, the device used by the user to enter the search query receives the prioritized listing of relational-specific images from the server, in step 610, the listing of the relational-specific images is provided for display via the application that provided the search input page 700, such as the display of the relational-specific images 704a, 704b, 704c on the search input page 700, as shown in FIG. 7A.

Figure 7B:
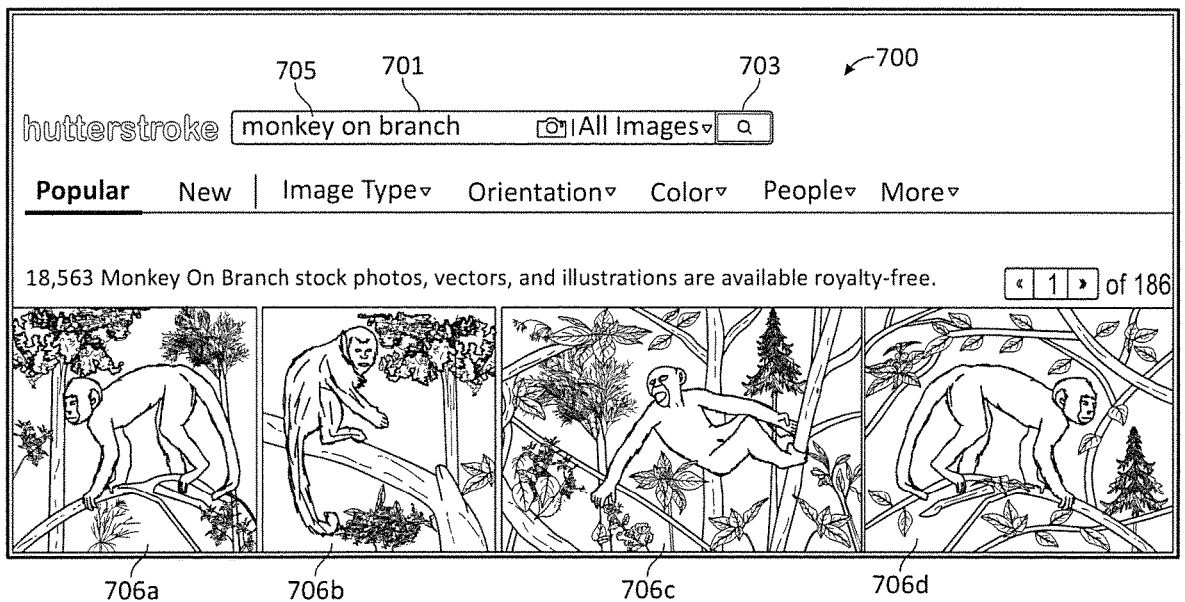

The search query 705 of "monkey on branch," as shown in FIG. 7B, is similarly processed by the server, and the server provides a corresponding prioritized listing of relational-specific images to the device used by the user to enter the search query 705, such as a smartphone, laptop, desktop, or other computing device of the user. The prioritized listing of relational-specific images for search query 705 is displayed to the user via the application that provided the search input page 700. An example of the prioritized listing of relational-specific images displayed to the user is shown in FIG. 7B, where images 706a, 706b, 706c, 706d are displayed on the search input page 700 of FIG. 7B.

Hardware Overview

Figure 8:
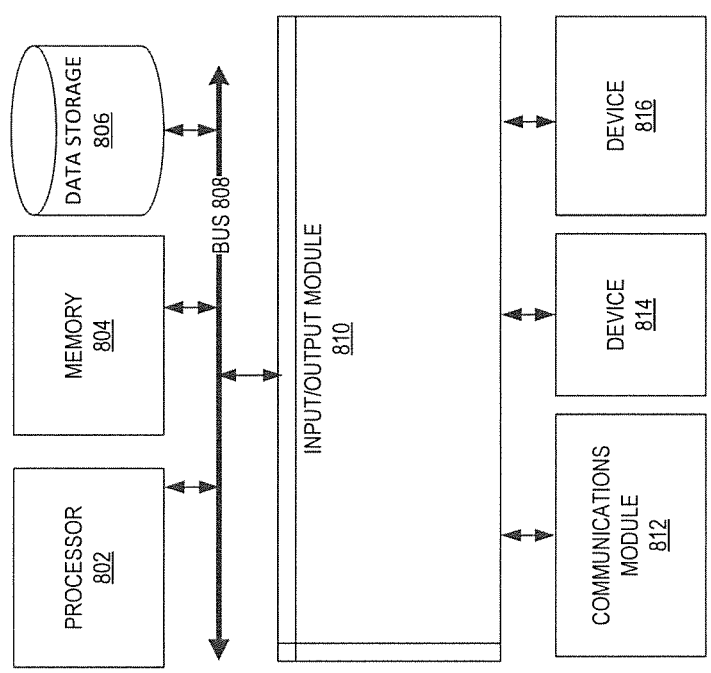
FIG. 8 is a block diagram illustrating an example computer system with which the client and server of FIG. 2 can be implemented.

FIG. 8 is a block diagram illustrating an exemplary computer system 800 with which the client 110 and server 120 of FIG. 1 can be implemented. In certain aspects, the computer system 800 may be implemented using hardware or a combination of software and hardware, either in a dedicated server, or integrated into another entity, or distributed across multiple entities.

Computer system 800 (e.g., client 110 and server 120) includes a bus 808 or other communication mechanism for communicating information, and a processor 802 (e.g., processor 212 and 236) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 (e.g., communications modules 218 and 238) include networking interface cards, such as Ethernet cards and modems. In certain aspects, the input/output module 810 is configured to connect to a plurality of devices, such as an input device 814 (e.g., input device 216) and/or an output device 816 (e.g., output device 214). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as a LCD (liquid crystal display) monitor, for displaying information to the user.

According to one aspect of the present disclosure, the client 110 and server 120 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
 receiving, from a client device, a search query for content, wherein the search query specifies one or more objects and one or more spatial relationships between the one or more objects;
 generating a query vector using a computer-operated neural language model;
 comparing the query vector to an indexed vector for each of one or more spatial relationships between one or more objects of an image;
 determining a listing of relational images from a collection of images based on the comparing;
 determining a ranking for each image in the listing of relational images; and
 providing a set of search results responsive to the search query to the client device, the set of search results including a prioritized listing of the listing of relational images based on the determined ranking, wherein the one or more spatial relationships between the one or more objects comprise a relative spatial position between an object pair selected from the one or more objects in the image, and wherein the indexed vector includes a relational value indicative of the relative spatial position between the object pair in the image.

2. The computer-implemented method of claim 1, further comprising: segmenting the search query into two or more elements.

3. The computer-implemented method of claim 1, wherein the query vector is generated based on a segmented search query element.

4. The computer-implemented method of claim 1, further comprising:
identifying the one or more objects within the image; and
for each of the one or more objects, calculating a position of the object within the image.

5. The computer-implemented method of claim 4, further comprising:
comparing a position of a first object among the one or more objects with a position of a second object among the one or more objects; and
determining, based on a comparison of the position of the first object and the position of the second object, a spatial relationship between the first object and the second object.

6. The computer-implemented method of claim 5, further comprising:
calculating a probability value that indicates a degree of similarity between the spatial relationship and a spatial relationship among the one or more spatial relationships specified in the search query.

7. The computer-implemented method of claim 6, wherein the ranking for each image is based on the probability value.

8. A system comprising:
a memory comprising instructions; and
one or more processors configured to execute the instructions to:
receive, from a client device, a search query for content, wherein the search query specifies one or more objects and one or more spatial relationships between the one or more objects;
segment the search query into two or more elements;
generate a query vector using a computer-operated neural language model;
compare the query vector to an indexed vector for each of one or more spatial relationships between one or more objects of an image;
determine a listing of relational images from a collection of images based on a comparison between the query vector and the indexed vector;
determine a ranking for each image in the listing of relational images; and
provide a set of search results responsive to the search query to the client device, the set of search results including a prioritized listing of multiple relational images based on the ranking, wherein the one or more spatial relationships between the one or more objects comprise a relative spatial position between an object pair selected from the one or more objects in the image, and wherein the indexed vector includes a relational value indicative of the relative spatial position between the object pair in the image.

9. The system of claim 8, wherein the query vector is generated based on a segmented search query element.

10. The system of claim 8, wherein the instructions further cause the one or more processors to:
identify the one or more objects within the image; and
for each of the one or more objects, calculate a position of the object within the image.

11. The system of claim 10, wherein the one or more processors are further configured to:
compare a position of a first object among the one or more objects with a position of a second object among the one or more objects; and
determine, based on a comparison of the position of the first object and the position of the second object, a spatial relationship between the first object and the second object.

12. The system of claim 11, wherein the one or more processors are further configured to:
calculate a probability value that indicates a degree of similarity between the spatial relationship and a spatial relationship among the one or more spatial relationships specified in the search query.

13. The system of claim 12, wherein the ranking for each image is based on the probability value.

14. A non-transitory machine-readable storage medium comprising machine-readable instructions for causing a processor to execute a method, comprising:
receiving, from a client device, a search query for content, wherein the search query specifies one or more objects and one or more spatial relationships between the one or more objects;
segmenting the search query into two or more elements;
generating, based on a segmented search query element, a query vector using a computer-operated neural language model;
comparing the query vector to an indexed vector for each of one or more spatial relationships between one or more objects of an image;
determining a listing of relational images from a collection of images based on the comparing;
determining a ranking for each image in the listing of relational images; and
providing a set of search results responsive to the search query to the client device, the set of search results including a prioritized listing of the relational images based on the determined ranking, wherein the one or more spatial relationships between the one or more objects comprise a relative spatial position between an object pair selected from the one or more objects in the image, and wherein the indexed vector includes a relational value indicative of the relative spatial position between the object pair in the image.

15. The non-transitory machine-readable storage medium of claim 14, wherein the machine-readable instructions further cause the processor to execute the method, further comprising:
identifying the one or more objects within an image; and
for each of the one or more objects, calculating a position of the object within the image.

16. The non-transitory machine-readable storage medium of claim 14, wherein the machine-readable instructions further cause the processor to execute the method, further comprising:
comparing a position of a first object among the one or more objects with a position of a second object among the one or more objects; and
determining, based on a comparison of the position of the first object and the position of the second object, a spatial relationship between the first object and the second object.

17. The non-transitory machine-readable storage medium of claim 16, wherein the machine-readable instructions further cause the processor to execute the method, further comprising calculating a probability value that indicates a degree of similarity between the spatial relationship and a spatial relationship among the one or more spatial relationships specified in the search query.

* * * * *